United States Patent
Noh et al.

(10) Patent No.: US 12,529,794 B2
(45) Date of Patent: Jan. 20, 2026

(54) VEHICLE AND METHOD FOR SELECTIVELY REMOVING SPECIFIC POINTS INCLUDED IN MULTIPLE LAYERS OF DATA RECEIVED FROM SENSOR

(71) Applicants: Hyundai Motor Company, Seoul (KR); Kia Corporation, Seoul (KR)

(72) Inventors: Mi Rim Noh, Jeollabuk-do (KR); Byoung Kwang Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 1144 days.

(21) Appl. No.: 17/493,297

(22) Filed: Oct. 4, 2021

(65) Prior Publication Data

US 2022/0107417 A1     Apr. 7, 2022

(30) Foreign Application Priority Data

Oct. 6, 2020  (KR) .......................... 10-2020-0128642

(51) Int. Cl.
*G01S 17/89* (2020.01)
*G01B 11/24* (2006.01)
*G01S 17/931* (2020.01)

(52) U.S. Cl.
CPC .............. *G01S 17/89* (2013.01); *G01B 11/24* (2013.01); *G01S 17/931* (2020.01)

(58) Field of Classification Search
CPC ...... G01S 17/89; G01S 17/931; G01S 7/4802; G01S 17/42; G01S 7/4861; G01B 11/24; G06F 18/23; B60W 40/02; B60W 2050/0043; B60W 2420/408; G06T 7/13
See application file for complete search history.

(56) References Cited

U.S. PATENT DOCUMENTS

| | | | |
|---|---|---|---|
| 11,288,861 B2 * | 3/2022 | Bosse | G06T 15/503 |
| 11,685,403 B2 * | 6/2023 | Manivasagam | G06N 3/045 |
| | | | 370/329 |
| 11,760,385 B2 * | 9/2023 | Manivasagam | G06N 3/08 |
| | | | 340/425.5 |
| 2021/0152996 A1 * | 5/2021 | Manivasagam | G08G 1/0112 |
| 2021/0192840 A1 * | 6/2021 | Bosse | G06T 17/05 |

FOREIGN PATENT DOCUMENTS

| | | |
|---|---|---|
| JP | 2006-119026 A | 5/2006 |
| KR | 10-1480651 B1 | 1/2015 |
| KR | 10-2016-0043811 A | 4/2016 |

* cited by examiner

*Primary Examiner* — Vijay Shankar
(74) *Attorney, Agent, or Firm* — Fox Rothschild LLP

(57) ABSTRACT

A device and method are configured to selectively remove specific points included in multiple layers of data received from a sensor. A vehicle may include a LiDAR sensor as the sensor, and a signal processor configured to select a static object included in the multiple layers, to select target layers from among the multiple layers, to define a shape formed by points included in each of the selected target layers, to select a reference layer based on the shape formed by the points, and to remove, based on a distance between a contour formed by the reference layer and each of points of remaining layers and a reference distance, corresponding points from at least one of the remaining layers.

13 Claims, 6 Drawing Sheets

| MAIN STEP | SUB-STEP |
|---|---|
| STATIC OBJECT DEFINITION (210) | - LENGTH OF OBJECT (A); EX. A = 16.7 M<br>- NUMBER OF POINTS FORMING CONTOUR OF OBJECT (B); EX. B = 7 |
| TARGET LAYER SELECTION (220) | - SELECTION BASED ON HEIGHT OF STATIC OBJECT (C); EX. C = 2 |
| SHAPE DETERMINATION (230) | - STRAIGHT CONNECTION LINE GENERATION (230-1)<br>- POINT SIGN DETERMINATION (230-2)<br>- POINT DISTANCE AVERAGE/VARIANCE CALCULATION (230-3)<br>- LAYER SHAPE DETERMINATION USING DISTANCE AVERAGE/VARIANCE (230-4)<br>FIRST DISTANCE REFERENCE COMPARISON (410);<br>VARIANCE REFERENCE COMPARISON (420);<br>POINT DISTRIBUTION COMPARISON (430);<br>SECOND DISTANCE REFERENCE COMPARISON (440);<br>DETERMINATION (450) |
| REFERENCE LAYER SELECTION (240) | - EQUATION SETTING ACCORDING TO SHAPE (240-1)<br>- REGRESSION APPLICATION (240-2)<br>- SELECTION OF LAYER HAVING SMALLEST ERROR AS REFERENCE LAYER (240-3) |
| SPECIFIC POINT REMOVAL (250) | - COMPARISON BETWEEN DISTANCE (D) BETWEEN POINT IN REFERENCE LAYE AND POINT IN REMAINING LAYER AND REMOVAL REFERENCE DISTANCE (RD)<br>- REMOVAL OF POINT SATISFYING D > RD FROM CORRESPONDING LAYER |

FIG. 2

| MAIN STEP | SUB-STEP |
|---|---|
| STATIC OBJECT DEFINITION (210) | - LENGTH OF OBJECT (A); EX. A = 16.7 M<br>- NUMBER OF POINTS FORMING CONTOUR OF OBJECT (B); EX. B = 7 |
| TARGET LAYER SELECTION (220) | - SELECTION BASED ON HEIGHT OF STATIC OBJECT (C); EX C = 2 |
| SHAPE DETERMINATION (230) | - STRAIGHT CONNECTION LINE GENERATION (230-1)<br>- POINT SIGN DETERMINATION (230-2)<br>- POINT DISTANCE AVERAGE/VARIANCE CALCULATION (230-3)<br>- LAYER SHAPE DETERMINATION USING DISTANCE AVERAGE/VARIANCE (230-4)<br>  FIRST DISTANCE REFERENCE COMPARISON (410);<br>  VARIANCE REFERENCE COMPARISON (420);<br>  POINT DISTRIBUTION COMPARISON (430);<br>  SECOND DISTANCE REFERENCE COMPARISON (440);<br>  DETERMINATION (450) |
| REFERENCE LAYER SELECTION (240) | - EQUATION SETTING ACCORDING TO SHAPE (240-1)<br>- REGRESSION APPLICATION (240-2)<br>- SELECTION OF LAYER HAVING SMALLEST ERROR AS REFERENCE LAYER (240-3) |
| SPECIFIC POINT REMOVAL (250) | - COMPARISON BETWEEN DISTANCE (D) BETWEEN POINT IN REFERENCE LAYE AND POINT IN REMAINING LAYER AND REMOVAL REFERENCE DISTANCE (RD)<br>- REMOVAL OF POINT SATISFYING D > RD FROM CORRESPONDING LAYER |

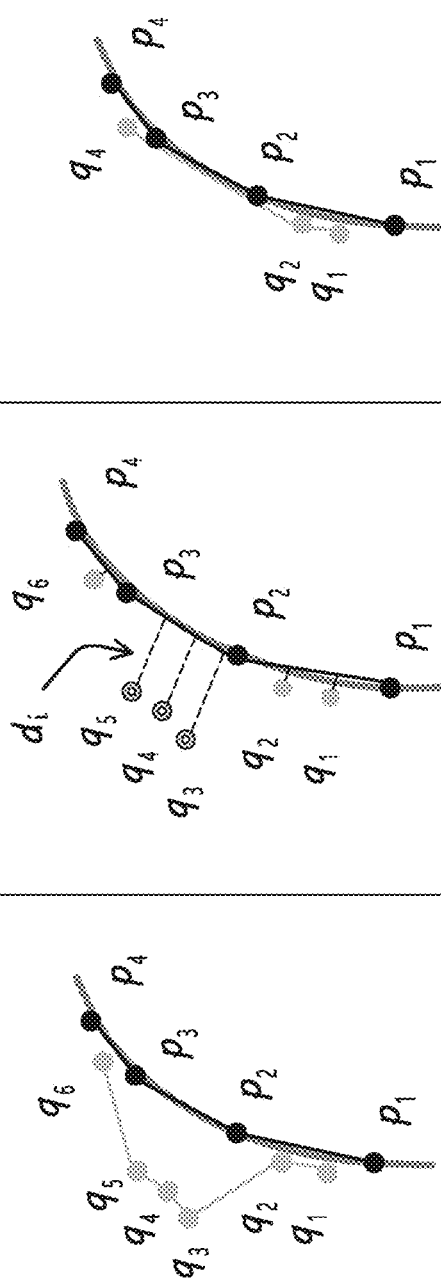
FIG. 6

VEHICLE AND METHOD FOR SELECTIVELY REMOVING SPECIFIC POINTS INCLUDED IN MULTIPLE LAYERS OF DATA RECEIVED FROM SENSOR

CROSS-REFERENCE TO RELATED APPLICATION

This application claims under 35 U.S.C. § 119(a) the benefit of Korean Patent Application No. 10-2020-0128642, filed on Oct. 6, 2020, the entire contents of which are incorporated by reference herein.

BACKGROUND

(a) Technical Field

The present disclosure relates to a method of defining a static object to be identified and of selectively removing specific points distinguished from the static object, which are included in multiple layers collected by a LiDAR sensor.

(b) Description of the Related Art

A LiDAR sensor constituting a LiDAR system is a device that radiates a laser pulse having a high output power to a surrounding atmosphere and receives a laser pulse reflected from a target object present near the same. The received signal is used for measurement of a distance between the LiDAR system and the target object, measurement of a speed and heading of the target object, analysis of substances in the surrounding atmosphere, and measurement of a concentration of the substances.

Since a vehicular LiDAR system mainly uses a laser pulse having a short wavelength of 905 nanometers (nm), the same has excellent three-dimensional (3D) map restoration performance, and thus may be suitable for use in autonomous vehicles. Because a laser pulse having a short wavelength has high linearity, the same is advantageously used to realize high resolution and precision and thus to perceive an object in three dimensions rather than in two dimensions.

Unlike indoor robots, which perceive objects using only one layer, autonomous vehicles use multiple layers in order to precisely perceive objects in consideration of the slope and curve of the road.

The LiDAR layer data (hereinafter referred to as layer data) received by a LiDAR system mounted in a host vehicle includes, for example, information about a static object such as a guardrail and information about a structure such as a bush present in the vicinity of the guardrail. In order to minimize an error when matching LiDAR layer data with a high-definition map, it is necessary to distinguish between the guardrail, which is an important factor to be determined, and the bush, which is an unimportant structure, and to remove data on the bush.

In the conventional art proposed to distinguish between a guardrail, which is a static object, and a bush, which is a structure, and to finally remove data on the bush from layer data, the static object and the structure are determined using only points included in each single layer of information received by a LiDAR system. However, in the case in which the points of the structure form a straight-line shape, there is a problem in that the points of the static object and the points of the structure are not perfectly distinguished from each other.

SUMMARY

Accordingly, the present disclosure is directed to a vehicle and method for selectively removing specific points included in multiple layers of data received from a sensor, i.e., a LiDAR sensor, that substantially obviate one or more problems due to limitations and disadvantages of the related art.

An object of the present disclosure is to provide a device for selectively removing specific points included in multiple layers, in which, in a case in which a static object is clustered with another structure into one object in logic in which contours formed by a plurality of layers are extracted from one object, a layer that forms the shape most similar to the shape of the static object is selected as a reference layer, and points associated with the structure that are included in another layer are removed based on the reference layer.

Another object of the present disclosure is to provide a method of selectively removing specific points included in multiple layers, in which, in the case in which a static object is clustered with another structure into one object in logic in which contours formed by a plurality of layers are extracted from one object, a layer that forms the shape most similar to the shape of the static object is selected as a reference layer, and points associated with the structure that are included in another layer are removed based on the reference layer.

However, the objects to be accomplished by the present disclosure are not limited to the above-mentioned objects, and other objects not mentioned herein will be clearly understood by those skilled in the art from the following description.

In accordance with an aspect of the present disclosure, the above and other objects can be accomplished by the provision of a vehicle equipped with a device for selectively removing specific points included in multiple layers, the vehicle including a signal processor configured to perform processes of selecting a static object included in multiple layers received from a LiDAR sensor, selecting target layers from among the multiple layers, defining a shape formed by a plurality of points included in each of the selected target layers, setting an equation corresponding to the shape, applying regression to the equation to select the layer having the smallest error as a reference layer, and removing, when the distance between a contour in the reference layer and a point in a remaining layer is longer than a reference distance, the corresponding point from the remaining layer.

In accordance with another aspect of the present disclosure, there is provided a method of selectively removing specific points included in multiple layers, the method including a target layer selection step of selecting target layers from among multiple layers received from a LiDAR sensor, a shape determination step of determining a shape formed by a plurality of points included in each of the target layers, a reference layer selection step of selecting one of the target layers as a reference layer based on the shape, and a specific point removal step of comparing points included in the reference layer with points included in remaining layers not selected as the reference layer, among the target layers, to remove points having low relevance to a predefined static object from the remaining layers. The above steps of the method may be performed by a signal processor.

In accordance with yet another aspect of the present disclosure, there is provided a non-transitory computer-readable recording medium containing program instructions executed by a processor including: program instructions that select target layers from among multiple layers received from a LiDAR sensor; program instructions that determine a shape formed by a plurality of points included in each of the target layers; program instructions that select one of the target layers as a reference layer based on the shape; and program instructions that compare points included in the reference layer with points included in remaining layers not selected as the reference layer, among the target layers, to remove points having low relevance to a predefined static object from the remaining layers.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 2 shows a method of selectively removing specific points included in multiple layers according to the present disclosure, which is performed by a signal processor;

FIG. 6 shows a process of removing a specific point according to the distance between a reference layer and a point in a remaining layer.

DETAILED DESCRIPTION OF THE DISCLOSURE

Figure 1:
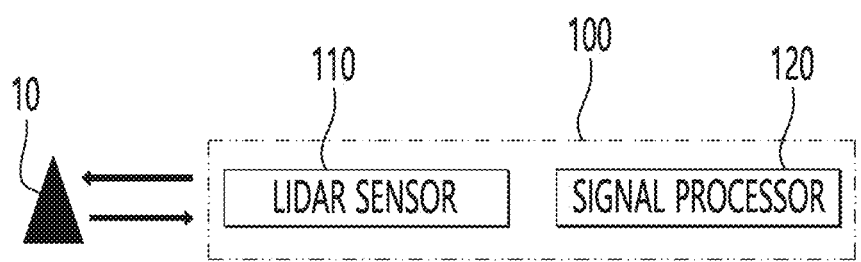
FIG. 1 shows a device for selectively removing specific points included in multiple layers according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In order to sufficiently understand the present disclosure, operational advantages of the present disclosure, and objects accomplished by the implementation of the present disclosure, the accompanying drawings illustrating exemplary embodiments of the present disclosure and the contents described therein should be referred to.

Hereinafter, preferred embodiments of the present disclosure will be described in detail with reference to the accompanying drawings. In the drawings, the same or similar elements are denoted by the same reference numerals.

FIG. 1 shows a device for selectively removing specific points included in multiple layers according to an embodiment of the present disclosure.

Referring to FIG. 1, a device 100 for selectively removing specific points included in multiple layers according to the present disclosure includes a LiDAR sensor 110 and a signal processor 120.

The LiDAR sensor 110 radiates a laser pulse to a target object 10 and receives a laser pulse reflected from the target object 10, thereby collecting multi-layer data (hereinafter referred to as "multiple layers"), which is sensor information on lateral planes defined at regular intervals in a vertical direction.

The signal processor 120 uses the multiple layers received from the LiDAR sensor 110 to perform processes of: (1) selecting a static object; (2) selecting target layers from among multiple layers; (3) defining a shape formed by a plurality of points (hereinafter referred to as a "shape") included in each of the selected target layers; (4) setting an equation corresponding to the shape defined in each of the target layers and applying regression to the equation to select the layer having the smallest error as a reference layer; and (5) comparing the reference layer with a point in the remaining layer and, when the distance between a segment of the reference layer and the point in the remaining layer is longer than a reference distance, removing the corresponding point from the corresponding layer. Here, the segment is an imaginary line interconnecting respective points included in the reference layer.

In some embodiments, the operation of the device 100 for selectively removing specific points included in multiple layers according to the present disclosure described above may be performed by a conventional LiDAR system including a LiDAR sensor and a controller. However, the controller of the conventional LiDAR system does not perform the function that is performed by the signal processor 120 of the present disclosure. Therefore, if a program is additionally installed in the conventional controller so as to perform the function that is performed by the signal processor 120 of the present disclosure, the above-described device 100 for selectively removing specific points included in multiple layers may be replaced with an otherwise conventional LiDAR system.

The device for selectively removing specific points included in multiple layers shown in FIG. 1 is preferably mounted in a vehicle.

Hereinafter, the processes performed by the signal processor 120 will be described.

FIG. 2 shows a method of selectively removing specific points included in multiple layers according to the present disclosure, which is performed by the signal processor.

Referring to FIG. 2, a method 200 of selectively removing specific points included in multiple layers according to the present disclosure includes a static object definition step 210, a target layer selection step 220, a shape determination step 230, a reference layer selection step 240, and a specific point removal step 250, all of which are performed by the signal processor 120.

In the static object definition step 210, the static object is defined based on the length a of the object and the number b of points forming the contour of the object. For example, in the case in which a guardrail of a highway is selected as a static object, determination of the static object should not be affected by dynamic objects including vehicles. In particular, since the shape of the contour of a vehicle, which is a dynamic object to be distinguished from the static object, should not be distorted, the reference length of an object is preferably set to 16.7 meters (m) in consideration of the length of a bus, i.e., 12 m, or the length of a trailer, i.e. 16.7 m, and the number of points forming the contour of a static object that is determined to be valid is preferably set to at least seven (b=7). A static object may be selected differently depending on the target to which the method 200 of selectively removing specific points included in multiple layers according to the present disclosure is to be applied, and the length of the object and the number of points forming the contour of the object may be changed depending on the selected static object.

In the target layer selection step 220, a layer group having a high probability of being selected as a reference layer is selected from among the multiple layers that are collected by the LiDAR sensor and are stacked on each other in a vertical direction. Basically, a layer in which the static object occupies a large proportion thereof is preferably selected as the reference layer. Because the length of the static object is considered in the static object definition step 210, selection of a layer in the target layer selection step 220 may be performed based on the height of the static object so as to be complementary to the static object definition step 210. In the case in which a guardrail is the static object, it is assumed that two consecutive layers that are located at the lowest position among the multiple layers are target layers with respect to the guardrail.

In the shape determination step 230, a shape formed by a plurality of points included in each of the target layers selected in the target layer selection step 220 is determined. At this time, the determined shape may be classified as, for example, "line", "arc", and "unknown". Determination of the shape includes steps of: generating a straight connection line interconnecting the start point and the end point among the points (a straight connection line generation step 230-1); determining signs of the points based on the straight connection line (a point sign determination step 230-2); measuring the distances between the straight connection line and the respective points to calculate the average and variance of the distances (a point distance average/variance calculation step 230-3); and determining the shape formed by the points included in a corresponding one of the target layers using the average and variance of the distances (a layer shape determination step 230-4).

The reference layer selection step 240 includes an equation setting step 240-1 of setting an equation corresponding to the shape, which is formed by the points included in each of the target layers and is determined in the shape determination step 230, a regression application step 240-2 of applying regression to the equation, and a selection step 240-3 of selecting the layer having the smallest error as a result of application of regression as the reference layer.

In the specific point removal step 250, the distance d between a point included in the reference layer selected in the reference layer selection step 240 and a point included in the remaining layer, which is not selected as the reference layer among the target layers, is compared with a removal reference distance Rd, and a point satisfying the condition of d>Rd is removed from the corresponding layer.

Hereinafter, the steps shown in FIG. 2 will be described in detail.

In the shape determination step shown in FIG. 2, the straight connection line generation step 230-1 and the point sign determination step 230-2 may be performed in various methods, one of which will be described below.

Figure 3:
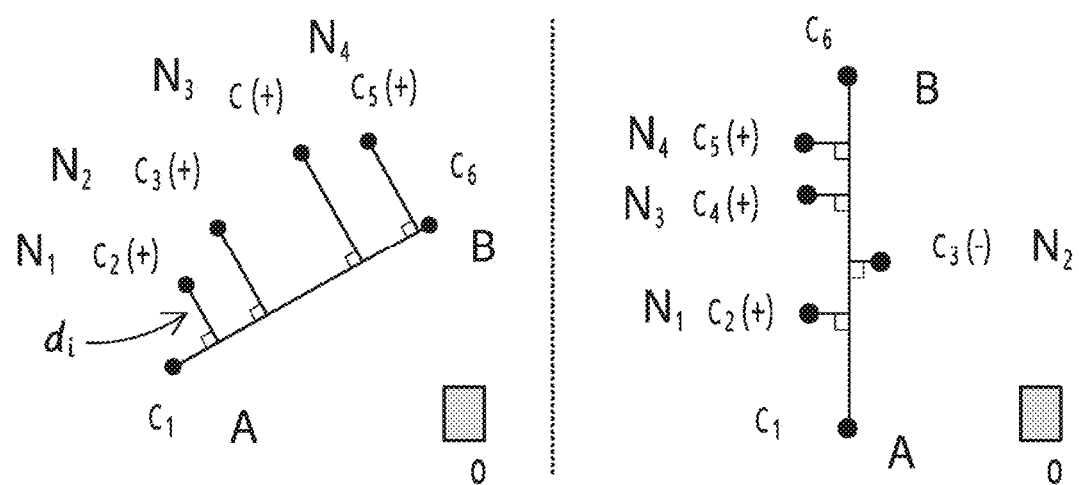
FIG. 3 shows a straight connection line generation step and a point sign determination step, in which the signs of points located between a start point and an end point are determined depending on the distribution positions thereof, in a shape determination step.

FIG. 3 shows the straight connection line generation step and the point sign determination step, in which the signs of points located between the start point and the end point are determined depending on the distribution positions thereof, in the shape determination step.

Referring to FIG. 3, the straight connection line $\overline{AB}$ is a line interconnecting the start point A and the end point B among the points. The start point A is the first point c1 among the points forming the contour, and the end point B is the sixth point c6 among the points forming the contour. The drawing on the left in FIG. 3 shows the case in which four points c2 to c5, other than the two points c1 and c6, are located to the left of the straight connection line $\overline{AB}$ and thus have positive signs (+), and the drawing on the right in FIG. 3 shows the case in which three points c2, c4 and c5 among the four points are located to the left of the straight connection line $\overline{AB}$ and thus have positive signs (+), and the third point c3 is located to the right of the straight connection line $\overline{AB}$ and thus has a negative sign (−).

The signs of the points shown in FIG. 3 are determined by the signal processor 120 performing the following calculation process.

The straight connection line $\overline{AB}$ is rotated 90°, and an inner product of a vector $\overrightarrow{AB}$ of the rotated straight connection line and a target vector $\overrightarrow{AC}$ interconnecting the start point A and a corresponding point Ci is obtained, whereby the sign y of the corresponding point may be expressed as in Equation 1 below.

$$y=(A_x B_y + B_x C_{yi} + C_{xi} A_y) - (A_y B_x + B_y C_{xi} + C_{yi} A_x)$$  [Equation 1]

Here, Ci represents a final contour point, Ni represents a contour point located between the start point A and the end point B, and i represents a variable.

The value of the corresponding point, which is obtained from Equation 1, has a positive sign when the angle between the two vectors $\overrightarrow{AB}$ and $\overrightarrow{AC}$ is smaller than 90°, and has a negative sign when the angle between the two vectors $\overrightarrow{AB}$ and $\overrightarrow{AC}$ is larger than 90°.

The distribution $R_{AB}$ of the points may be calculated based on the number of points having a positive sign and the number of points having a negative sign, and the side of the straight connection line $\overline{AB}$ on which the points are concentratedly located may be confirmed based on the distribution $R_{AB}$ of the points. The distribution $R_{AB}$ of the points is used in the shape determination step 230, which will be described later.

Figure 4:
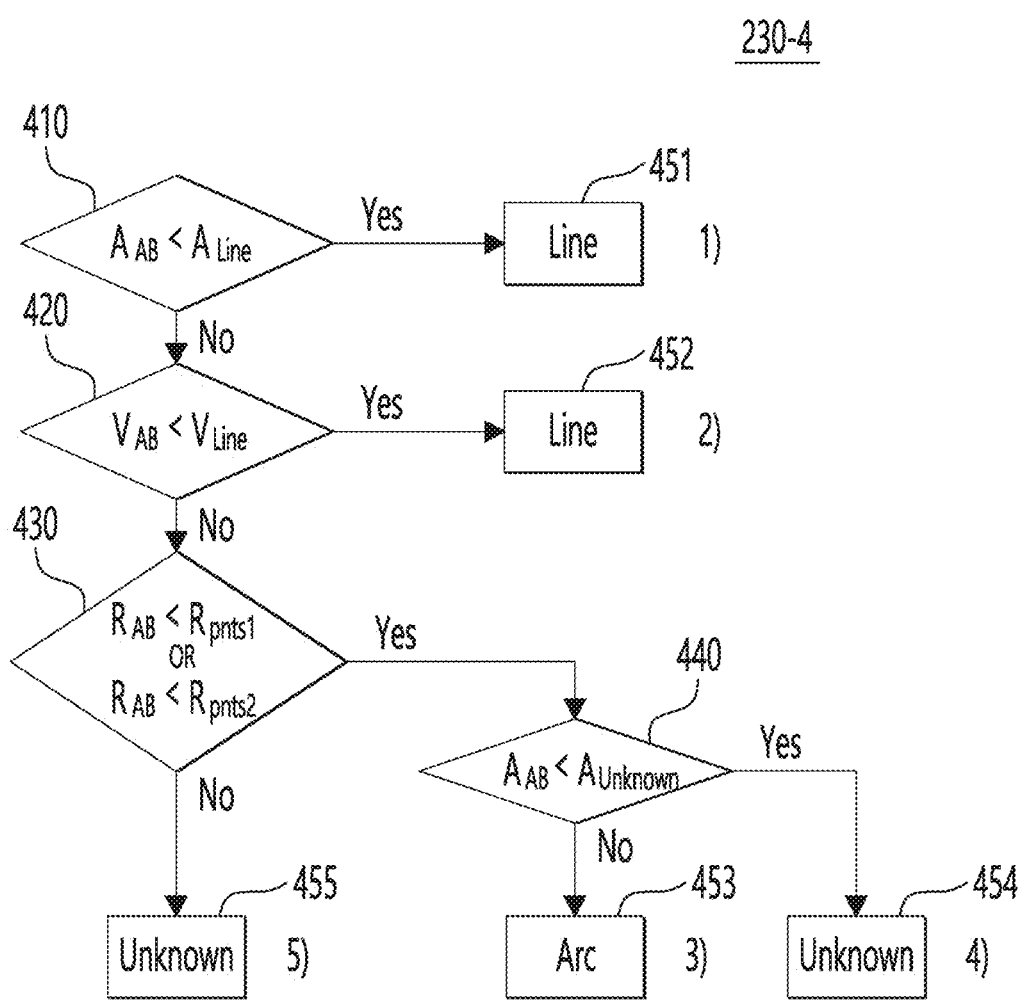
FIG. 4 shows the shape determination step in which the shape formed by points included in each of target layers is determined using the average and variance of the distances between a straight connection line and respective points.

FIG. 4 shows the shape determination step in which the shape formed by the points included in each of the target layers is determined using the average and variance of the distances between the straight connection line and the respective points.

It is not difficult to calculate the distances between the straight connection line and the respective points, and thus a detailed description thereof will be omitted.

The average $A_{AB}$ and variance $V_{AB}$ of the distances between the straight connection line and the respective points may be obtained using Equation 2 below.

$$A_{AB} = \frac{1}{n}\sum_{i=1}^{n} x_i$$

$$V_{AB} = \frac{1}{n}\sum_{i=1}^{n} (x_i - A_{AB})^2$$

[Equation 2]

In FIG. 4, $A_{Line}$ represents the first reference average distance, $V_{Line}$ represents the reference variance, $R_{pnts1}$ represents the first point reference distribution, and $R_{pnts2}$ represents the second point reference distribution.

Referring to FIG. 4, the layer shape determination step 230-4, in which the shape formed by the points included in each of the target layers is determined using the average distance $A_{AB}$ and the distance variance $V_{AB}$, includes a first distance reference comparison step 410, a variance reference comparison step 420, a point distribution comparison step 430, a second distance reference comparison step 440, and a determination step 450.

In the first distance reference comparison step 410, whether the average distance $A_{AB}$ is less than the first reference average distance $A_{Line}$ is determined.

The variance reference comparison step 420 is performed when it is determined in the first distance reference comparison step 410 that the average distance $A_{AB}$ is greater than the first reference average distance $A_{Line}$ (No in step 410). In the variance reference comparison step 420, whether the distance variance $V_{AB}$ is less than the reference variance $V_{Line}$ is determined.

The point distribution comparison step 430 is performed when it is determined in the variance reference comparison step 420 that the distance variance $V_{AB}$ is greater than the reference variance $V_{Line}$ (No in step 420). In the point distribution comparison step 430, whether the point distribution $R_{AB}$ is greater than the first point reference distribution $R_{pnts1}$ or less than the second point reference distribution $R_{pnts2}$ is determined.

The second distance reference comparison step 440 is performed when it is determined in the point distribution comparison step 430 that the point distribution $R_{AB}$ is greater than the first point reference distribution $R_{pnts1}$ or less than the second point reference distribution $R_{pnts2}$ (Yes in step 430). In the second distance reference comparison step 440, whether the average distance $A_{AB}$ is greater than the second reference average distance $A_{Unknown}$ is determined.

In the determination step 450, when it is determined in the first distance reference comparison step 410 that the average distance $A_{AB}$ is less than the first reference average distance $A_{Line}$ (Yes in step 410) and when it is determined in the variance reference comparison step 420 that the distance variance $V_{AB}$ is less than the reference variance $V_{Line}$ (Yes in step 420), the corresponding layer is determined to have a "line" shape (steps 451 and 452). In addition, when it is determined in the second distance reference comparison step 440 that the average distance $A_{AB}$ is less than the second reference average distance $A_{Unknown}$ (No in step 440), the corresponding layer is determined to have an "arc" shape (step 453). In addition, when it is determined in the point distribution comparison step 430 that the point distribution $R_{AB}$ is a value between the first point reference distribution $R_{pnts1}$ and the second point reference distribution $R_{pnts2}$ (No in step 430) and when it is determined in the second distance reference comparison step 440 that the average distance $A_{AB}$ is greater than the second reference average distance $A_{Unknown}$ (Yes in step 440), the corresponding layer is determined to have an "unknown" shape (steps 455 and 454).

In order to help understanding the process shown in FIG. 4, it is assumed that the first reference average distance $A_{Line}$, the reference variance $V_{Line}$, the first point reference distribution $R_{pnts1}$, the second point reference distribution $R_{pnts2}$, and the second reference average distance $A_{Unknown}$ are 0.35 m, 0.01, 85%, 15%, and 1 m, respectively.

In the first distance reference comparison step 410, whether the layer to be compared has a "line" shape is determined based on the average distance $A_{AB}$. At this time, the determination reference is that the average distance $A_{AB}$ is shorter than 0.35 m, which is the first reference average distance $A_{Line}$.

In the variance reference comparison step 420, whether the layer that has been determined not to have a "line" shape based on the average distance $A_{AB}$ has a "line" shape is determined again based on the distance variance $V_{AB}$. At this time, the determination reference is that the distance variance $V_{AB}$ is less than 0.01, which is the reference variance $V_{Line}$.

As described above, whether the layer to be compared has a "line" shape is determined through the first distance reference comparison step 410 and the variance reference comparison step 420. When the layer is determined not to have a "line" shape, the following process is performed.

In the point distribution comparison step 430, whether the layer that has been determined not to have a "line" shape has an "arc" shape is primarily determined based on the point distribution $R_{AB}$, specifically, based on whether the points shown in FIG. 3 are concentratedly located to the left of the straight connection line $\overline{AB}$ or to the right of the straight connection line $\overline{AB}$. At this time, based on any one of the two signs, the first point reference distribution $R_{pnts1}$ is set to 85%, and the second point reference distribution $R_{pnts2}$ is set to 15%. In other words, the condition under which the corresponding layer is determined to have a possibility of having an "arc" shape is that the point distribution $R_{AB}$ is greater than 85% or less than 15%. If this condition is not satisfied, the layer that has already been determined not to have a "line" shape is also determined not to have an "arc" shape. Accordingly, the corresponding layer is determined to have an "unknown" shape (step 455).

In the second distance reference comparison step 440, whether the average distance $A_{AB}$ of the layer that has been primarily determined to have a possibility of having an "arc" shape in the point distribution comparison step 430 is greater than the second reference average distance $A_{Unknown}$ is an determined in order to finally determine whether the layer has "arc" shape. Although the average distance $A_{AB}$ of the corresponding layer has been determined to be longer than 0.35 m, which is the first reference average distance $A_{Line}$, in the first distance reference comparison step 410 prior to the second distance reference comparison step 440, the average distance $A_{AB}$ is not infinitely long. Therefore, the upper limit of the average distance $A_{AB}$ is determined in order to finally determine whether the corresponding layer has an "arc" shape. Since the second reference average distance $A_{Unknown}$ is set to 1 m, if the average distance $A_{AB}$ of the corresponding layer is between 0.35 m and 1 m, the corresponding layer is determined to have an "arc" shape (step 453), and if not, the corresponding layer is determined to have an "unknown" shape (step 454).

After the layer is determined to have an "arc", "line" or "unknown" shape through the above-described process shown in FIG. 4, the reference layer is selected as described below. Because it is meaningless to select the layer determined to have an "unknown" shape as the reference layer, a process of selecting the "arc" or "line"-shaped layer as the reference layer will be described below.

Figure 5:
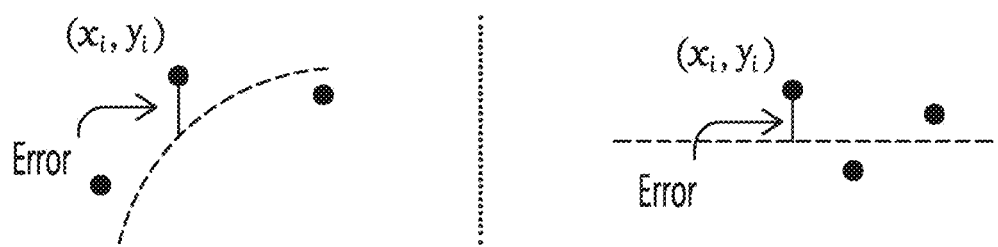
FIG. 5 shows an error that occurs after performing regression during a reference layer selection step.

FIG. 5 shows an error that occurs after performing regression during the reference layer selection step.

Referring to FIG. 5, the "arc" in the drawing on the left is modeled using a quadratic equation, and the "line" in the drawing on the right is modeled using a linear equation, as shown in Equation 3 below.

$$y = a_2 x^2 + a_1 x + a_0$$

$$y = a_1 x + a_0 \quad \text{[Equation 3]}$$

In principle, among a plurality of layers that are determined in shape and modeled, the model having the smallest error after performing regression is selected as the reference layer. Described more precisely, the model having the smallest sum of squares of errors is selected as the reference layer.

Equation 4 below is an equation for calculating the sum S of squares of errors of a layer that is determined to have an "arc" shape, and Equation 5 below is an equation for calculating the sum S of squares of errors of a layer that is determined to have a "line" shape.

$$S = \sum_{i=1}^{n} E_i^2 = \sum_{i=1}^{n} (y_i - a_0 - a_1 x_i - a_2 x_i^2)^2 \quad \text{[Equation 4]}$$

$$\frac{\partial S}{\partial a_0} = \sum_{i=1}^{n} 2(y_i - a_0 - a_1 x_i - a_2 x_i^2)(-1) = 0$$

$$\frac{\partial S}{\partial a_1} = \sum_{i=1}^{n} 2(y_i - a_0 - a_1 x_i - a_2 x_i^2)(-x_i) = 0$$

$$\frac{\partial S}{\partial a_2} = \sum_{i=1}^{n} 2(y_i - a_0 - a_1 x_i - a_2 x_i^2)(-x_i^2) = 0$$

$$\begin{bmatrix} a_0 \\ a_1 \\ a_2 \end{bmatrix} = \begin{bmatrix} n & \sum_{i=1}^{n} x_i & \sum_{i=1}^{n} x_i^2 \\ \sum_{i=1}^{n} x_i & \sum_{i=1}^{n} x_i^2 & \sum_{i=1}^{n} x_i^3 \\ \sum_{i=1}^{n} x_i^2 & \sum_{i=1}^{n} x_i^3 & \sum_{i=1}^{n} x_i^4 \end{bmatrix}^{-1} \begin{bmatrix} \sum_{i=1}^{n} y_i \\ \sum_{i=1}^{n} x_i y_i \\ \sum_{i=1}^{n} x_i^2 y_i \end{bmatrix}$$

$$S = \sum_{i=1}^{n} E_i^2 = \sum_{i=1}^{n} (y_i - a_0 - a_1 x_i)^2 \quad \text{[Equation 5]}$$

$$\frac{\partial S}{\partial a_0} = \sum_{i=1}^{n} 2(y_i - a_0 - a_1 x_i)(-1) = 0$$

$$\frac{\partial S}{\partial a_1} = \sum_{i=1}^{n} 2(y_i - a_0 - a_1 x_i)(-x_i) = 0$$

$$\begin{bmatrix} a_0 \\ a_1 \end{bmatrix} = \begin{bmatrix} n & \sum_{i=1}^{n} x_i \\ \sum_{i=1}^{n} x_i & \sum_{i=1}^{n} x_i^2 \end{bmatrix}^{-1} \begin{bmatrix} \sum_{i=1}^{n} y_i \\ \sum_{i=1}^{n} x_i y_i \end{bmatrix}$$

Equations 4 and 5 above are applied to corresponding layers such that the layer in which the sum S of squares of errors is the smallest is selected as the reference layer. Thereafter, the specific point removal step 250 is performed as follows.

FIG. 6 shows a process of removing a specific point according to the distance between the reference layer and a point in the remaining layer.

The drawing on the left in FIG. 6 shows the situation in which a guardrail and a bush are present together, the drawing in the middle in FIG. 6 shows a distance value di calculated after sorting points along the X-axis, and the drawing on the right in FIG. 6 shows a result obtained by removing points in the remaining layer when the distance between the segment of the reference layer and each of the points in the remaining layer is longer than the removal reference distance Rd.

The embodiment is described on the assumption that the static object is a guardrail, and thus the removal reference distance Rd is set to 0.5 m. However, the removal reference distance may be set differently depending on the static object to be identified. When the distance between the reference layer and each of the points in the remaining layer is longer than 0.5 m, which is the removal reference distance Rd, the corresponding point is removed from the remaining layer.

As is apparent from the above description, a vehicle and method for selectively removing specific points included in multiple layers completely overcome the limitations of the conventional art that uses a single layer. In addition, since the shape of a static object is accurately recognized, the performance of a classification or tracking algorithm during processing of LiDAR signals may be improved. In particular, it is possible to minimize an error when matching LiDAR layer data with a high-definition map, thereby securing the driving safety of autonomous vehicles.

While the present disclosure has been particularly shown and described with reference to exemplary embodiments thereof, these embodiments are only proposed for illustrative purposes, and do not restrict the present disclosure. Further, it will be apparent to those skilled in the art that various modifications, additions and substitutions are possible, without departing from the scope and spirit of the disclosure as disclosed in the accompanying claims.

What is claimed is:
1. A method of selectively removing specific points included in multiple layers received from a LIDAR sensor, the method comprising:
a step of determining a static object included in multiple layers received from a LIDAR sensor a target layer selection step of selecting, by a signal processor, target layers including at least part of the static object from among the multiple layers received from the LiDAR sensor;

a shape determination step of determining, by the signal processor, a shape formed by a plurality of points included in each of the target layers;

a reference layer selection step of selecting, by the signal processor, one of the target layers as a reference layer based on the shape; and a specific point removal step of comparing, by the signal processor, points included in the reference layer with points included in remaining layers not selected as the reference layer, among the target layers, to remove at least one point associated with the static object from the remaining layers.

2. The method according to claim 1, wherein a length of an object and a number of points forming a contour of the object are used as a reference to define the static object.

3. The method according to claim 1, wherein the target layers are selected based on a height of the static object.

4. The method according to claim 1, wherein a shape determined in the shape determination step is one of a "line" shape, an "arc" shape, and an "unknown" shape.

5. The method according to claim 4, wherein the shape determination step comprises:

a straight connection line generation step of generating a straight connection line interconnecting a start point and an end point among points included in each of the target layers; a point sign determination step of determining signs of points based on the straight connection line to calculate a distribution of the points;

a point distance average/variance calculation step of measuring distances between the straight connection line and respective points to calculate an average and a variance of the distances; and a layer shape determination step of determining a shape formed by points included in a corresponding one of the target layers using the average and the variance of the distances.

6. The method according to claim 5, wherein the point sign determination step comprises:

rotating the straight connection line by 90°; and obtaining an inner product of a vector of the rotated straight connection line and a target vector interconnecting the start point and a target point, wherein a value of the target point is determined to have a positive sign when an angle between the vector of the rotated straight connection line and the target vector is smaller than 90°, and is determined to have a negative sign when the angle is larger than 90°.

7. The method according to claim 5, wherein the layer shape determination step comprises:

a first distance reference comparison step of determining whether the average of the distances is less than a first reference average distance;

a variance reference comparison step of determining whether the variance of the distances is less than a reference variance, the variance reference comparison step being performed when it is determined in the first distance reference comparison step that the average of the distances is greater than the first reference average distance;

a point distribution comparison step of determining whether the distribution of the points is greater than a first point reference distribution or less than a second point reference distribution, the point distribution comparison step being performed when it is determined in the variance reference comparison step that the variance of the distances is greater than the reference variance;

a second distance reference comparison step of determining whether the average of the distances is greater than a second reference average distance, the second distance reference comparison step being performed when it is determined in the point distribution comparison step that the distribution of the points is greater than the first point reference distribution or less than the second point reference distribution; and a determination step of determining a corresponding layer to have the "line" shape when it is determined in the first distance reference comparison step that the average of the distances is less than the first reference average distance and when it is determined in the variance reference comparison step that the variance of the distances is less than the reference variance, of determining a corresponding layer to have the "arc" shape when it is determined in the second distance reference comparison step that the average of the distances is less than the second reference average distance, and of determining a corresponding layer to have the "unknown" shape when it is determined in the point distribution comparison step that the distribution of the points is a value between the first point reference distribution and the second point reference distribution and when it is determined in the second distance reference comparison step that the average of the distances is greater than the second reference average distance.

8. The method according to claim 1, wherein the reference layer selection step comprises:

an equation setting step of setting an equation corresponding to a shape of each of the target layers determined in the shape determination step;

a regression application step of applying regression to the equation; and a selection step of selecting a layer having a smallest error as a result of application of the regression as a reference layer.

9. The method according to claim 8, wherein the equation setting step comprises: setting a quadratic equation when a corresponding one of the target layers has an "arc" shape; and setting a linear equation when a corresponding one of the target layers has a "line" shape.

10. The method according to claim 8, wherein, in the selection step, the layer having the smallest error is a layer having a smallest sum of squares of errors.

11. The method according to claim 1, wherein, in the specific point removal step, it is determined that the relevance is low when a distance between a segment of the reference layer and each of points included in the remaining layers is longer than a removal reference distance.

12. A non-transitory computer-readable recording medium containing program instructions executed by a processor, the non-transitory computer-readable recording medium comprising:

program instructions that determine a static object included in multiple layers received from a LIDAR sensor program instructions that select target layers including at least part of the static object from among the multiple layers received from the LiDAR sensor;

program instructions that determine a shape formed by a plurality of points included in each of the target layers;

program instructions that select one of the target layers as a reference layer based on the shape; and program instructions that compare points included in the reference layer with points included in remaining layers not selected as the reference layer, among the target layers, to remove at least one point associated with the static object from the remaining layers.

13. A vehicle, comprising:

a LiDAR sensor; and a signal processor configured to:
- select a static object included in multiple layers received from the LiDAR sensor,
- select target layers including at least part of the static object from among the multiple layers received from the LIDAR sensor,
- define a shape formed by points included in each of the selected target layers,
- select a reference layer amongst the target layers based on the shape formed by the points, and
- remove, based on a distance between a contour formed by the reference layer and each of points of remaining layers and a reference distance, at least one point associated with the static object from at least one of the remaining layers.

* * * * *